United States Patent [19]

Jünger et al.

[11] 3,877,967
[45] Apr. 15, 1975

[54] METHOD OF IMPROVING THE STRENGTH OF ADHESION OF CELLULOSIC COVERINGS TO PHENOLIC RESIN FOAM MATERIALS

[76] Inventors: Hans Jünger, Emil-Müeller-Str. 21, 521 Troisdorf; Franz Weissenfels, Am Grafenkrauz 17, 52 Siegburg; Wolfgang Pungs, Paul-Müeller-Str. 1, 521 Troisdorf, all of Germany

[22] Filed: Oct. 30, 1972

[21] Appl. No.: 302,377

[30] Foreign Application Priority Data
Nov. 2, 1971  Germany............................ 2154346

[52] U.S. Cl. .................. 428/314; 156/79; 156/335; 156/337; 427/244; 260/2.5 F
[51] Int. Cl.............................................. B44d 1/092
[58] Field of Search ............ 117/56, 60, 76 P, 76 T, 117/92, 155 L, 158, 161 L, 168; 156/79, 156/335, 337; 161/159; 260/2.5 F

[56] References Cited
UNITED STATES PATENTS
2,964,424  12/1960  Mast...................................... 117/98

| | | |
|---|---|---|
| 3,290,260 | 12/1966 | Buccigross....................... 117/98 X |
| 3,360,415 | 12/1967 | Hellman et al. .................... 161/159 |
| 3,397,082 | 8/1968 | Podlipnik et al.................... 117/158 |
| 3,537,929 | 11/1970 | Keith et al. ...................... 260/2.5 X |
| 3,537,951 | 11/1970 | Anderson et al. .................. 161/259 |
| 3,726,708 | 4/1973 | Weissenfels et al. ........... 117/168 X |

*Primary Examiner*—Michael R. Lusignan
*Attorney, Agent, or Firm*—Burgess, Dinklage & Sprung

[57]  ABSTRACT

A method for improving the strength of adhesion of a fibrous covering material to a phenolic resin foam which comprises treating the fibrous covering material, on at least the side which is to come in contact with the phenolic resin foam, with a high boiling paraffinic hydrocarbon or chlorinated hydrocarbon and thereafter foaming a phenolic resin foam in contact with the side of the fibrous covering material treated with the paraffinic hydrocarbon or chlorinated hydrocarbon.

8 Claims, No Drawings

METHOD OF IMPROVING THE STRENGTH OF ADHESION OF CELLULOSIC COVERINGS TO PHENOLIC RESIN FOAM MATERIALS

BACKGROUND OF THE INVENTION

1. Field of the Invention

This invention is directed to a method of producing boards from phenolic resin foams and to papers and paperboards bonded thereto. In particular, this invention is directed to a process for improving the adhesion of fibrous covering materials to phenolic resin foam surfaces. In particular this invention is directed to improving the adhesion of cellulosic fibrous covering materials to the surfaces of phenolic resin foam by treatment of the cellulosic material with a high boiling paraffinic hydrocarbon or a chlorinated hydrocarbon.

2. Discussion of the Prior Art

Porous materials containing cellulose fibers, such as millboard, wool felt pasteboard, soda kraft paper, etc., adhere to phenolic resin foam, but under great mechanical stress the covering may become torn from the foam board. Bonding various papers or cardboards to phenolic resin foam boards provides the boards with a degree of external protection against mechanical damage. It is known to improve the strength of adhesion between phenolic resin foams and coverings containing fibers by applying an adhesivizing agent, the adhesivizing agents being products of the condensation of phenols with aldehydes or solutions of polyamides, acetals of butadienes.

The strength of adhesion of papers or paperboards to phenolic resin foam materials, however, is often further diminished by some other additional preparation process, using bitumen, for example. This additional proportion of the covering materials is often used on account of a particular utilization of the surfaces of the phenolic resin foam boards, as for example in the case of bituminized wool felt paperboards, in which cementability with hot bituminous adhesives is improved.

SUMMARY OF THE INVENTION

It has now surprisingly been found that the strength of adhesion of a fibrous covering material, especially a cellulose fibrous covering material to phenolic resin foam boards can be improved by a process wherein the fibrous covering material is treated, at least on the side to which the foamable phenolic resin is to be applied, with a high boiling, paraffinic hydrocarbon or chlorinated hydrocarbon or a mixture thereof, or a mixture thereof with solvents, and thereafter foaming a phenolic resin on the side of the covering material treated with the paraffinic hydrocarbon or chlorinated hydrocarbon.

Generally speaking, the process of the present invention is performed by treating a fibrous covering material with between 0.5 and 40 weight percent, based upon the weight of the covering material, with a high boiling paraffinic hydrocarbon or chlorinated hydrocarbon in a fluid state. Preferably, the amount of paraffinic hydrocarbon or chlorinated hydrocarbon employed is between 0.5 and 40 weight percent, based upon the weight of the fibrous covering material.

As stated above, the fibrous covering material is treated with a fluid high boiling paraffinic hydrocarbon or chlorinated hydrocarbon. by the term "fluid" it is intended to mean hydrocarbons and chlorinated hydrocarbons which are normally liquid under the conditions of the treatment of the fibrous covering material. Indeed, the material can be fluid to unctuous. If the high boiling paraffinic hydrocarbon or chlorinated hydrocarbon is not fluid, i.e., does not flow under the conditions of treatment, the same can be applied in melted form or in the form of a solution wherein it is the solute. Hydrocarbon solvents can be employed to dissolve high boiling paraffinic hydrocarbons and chlorinated hydrocarbons. Indeed, numerous solvents can be employed for this purpose, some of which are listed below: low boiling aliphatic and/or aromatic hydrocarbon solvents, e.g., benzine fractions, low boiling aromatics, i.e., benzene, toluene, xylene.

It is considered quite surprising that these high boiling paraffinic hydrocarbons or chlorinated hydrocarbons will function as an adhesive in assisting in joining fibrous covering materials to phenolic resin foam boards since these agents have often been used as parting agents in the working of compounds containing phenolic resins. Thus, to find that they function particularly well as an agent which performs an adhesive function is most surprising.

It has been stated above that the hydrocarbons are employed in a fluid form, i.e., in the liquid, unctuous, hot melt form or in the form of a solution. It is important in the practice of the present invention that the hydrocarbon be in a "fluid" state. For the effect of the present invention, it is essential that the hydrocarbons in the form in which they are used have a good ability to penetrate into the fibrous covering material. Such is particularly true in the case of papers and paperboards. Only through the use of a fluid hydrocarbon will it be assured that the paper or paperboard will be impregnated with the hydrocarbons to the desired extent. The impregnation must be so controlled that, when the phenolic resin foam is combined with the impregnated paper or other fibrous covering material, there will be no intermediate layer of impregnating agent disposed between the foam and the paper.

DESCRIPTION OF PREFERRED EMBODIMENTS

In the practice of the present invention, numerous different types of high boiling paraffinic hydrocarbons and chlorinated hydrocarbons can be used. As a guide thereto, the following types are particularly contemplated:

1. Liquid, unctuous or solid hydrocarbons consisting essentially of paraffin or naphtene based hydrocarbons or mixtures thereof having flash points above 150°C, as determined in accordance with Deutsche Industrie Norm 51,584, and having a solidification point determined in accordance with Deutsche Industrie Norm 51,556 to at least 105°C, and preferably within the range of 40° to 60°C. in the case of unctuous or solid hydrocarbons. Preferably they have a boiling point of at least 250°C, and especially within the range of 280° to 340°C. Mixtures of higher hydrocarbons than indicated above can be employed providing they fulfill the above requirements and consist essentially of hydrocarbons, i.e., have a hydrocarbon component having at least 80% hydrocarbon which has a flash point above 150°C and a solidification point between 40° and 105°C. Hydrocarbonaceous components containing, for instance, oxygen, sulfur, nitrogen or chlorine can be tolerated in minor amounts up to 20% provided they fulfill the above requirements.

2. Solutions of the above-named hydrocarbons of flash point above 150°C and solidification point above 105°C, especially solutions of paraffinic hydrocarbons which are solid at room temperatures and mixtures thereof in organic solvents such as benzine and chlorinated hydrocarbons, especially chlorinated alkanes.

3. Fluid, unctuous or solid chlorinated paraffins having a chlorine content between 10 and 75% by weight. Chlorinated paraffins preferably have densities of 1.1 to 1.55. Generally speaking, they have at least a chlorine content from 10 to 75 percent, preferably between 15 and 70 percent.

4. Chlorinated paraffins of the type in paragraph 3 in dissolved or melted form.

5. Mixtures consisting principally of hydrocarbons and chlorinated hydrocarbons falling within paragraphs 1 and 3 above.

It has been found in accordance with the invention that minor amounts of impurities can be tolerated in the paraffinic hydrocarbons contemplated for use in accordance with the present invention. Specifically, it has been found that olefinically unsaturated hydrocarbons can be tolerated provided that the mixture of paraffinic hydrocarbons is made of components which are compatible with one another and the physical properties of the mixture of paraffinic hydrocarbons remain within the limitations stated above.

Generally speaking, the covering materials which can be treated with the hydrocarbons or chlorinated hydrocarbons can be made of organic or inorganic synthetic or natural fibers in the form of fabric and mats. Particularly, contemplated covering materials are those containing cellulose fibers such as papers or cardboards of good absorbency such as soda kraft paper, millboard or pasteboard. The covering materials can also be treated with various agents such as bitumen or fireproofing agents.

The impregnation of the covering materials with the hydrocarbons is performed in a conventional manner, as by brushing or spraying with the paraffinic hydrocarbons or chlorinated paraffins these being melted or dissolved or emulsified as the case may be.

The preparation of the covering materials containing the paraffinic hydrocarbons or chlorinated paraffins in accordance with the invention can be performed either immediately prior to the application of the foamable phenolic resin mixture to the continuous sheets of covering material, or, for example, just after the paper-making process, because the paraffin hydrocarbons generally do not cause the rolled papers to stick together.

By foamable phenolic resol resins are meant, in accordance with the invention, products of the condensation of one mole of a phenol with 1 to 3 moles of an aldehyde. The condensation takes place in an alkaline medium. Not only phenol itself but also its homologs and alkyl substitution products may be used as phenols, such as resorcinol, pyrocatechol, the cresols of xylenols, or mixtures of these compounds. The aldehydes reacting with the phenols include formaldehyde, compounds which decompose to formaldehyde (e.g., paraformaldehyde or trioxane), acetaldehyde, furfurol and hexamethylenetetramine, as well as mixtures of these compounds.

After the condensation of the two reagents, the water contained in the condensation mixture is removed by distillation, preferably in vacuo, until the suitable viscosity range between 2,000 and 10,000 cP is reached or a suitable solid resin content (50 to 80%). The pH value is adjusted in some cases to a value greater than 4.

The foaming and setting of the phenolic resol resin is performed by the addition of known blowing agents and hardeners. The following are examples of preferred blowing agents: chlorofluoromethanes, n-pentane, petroleum ethers, methylene chloride or ethylene dichloride, or other easily boiling organic solvents. Solid blowing agents, however, such as alkali and alkaline earth carbonates, may also be used. The hardeners are mainly aromatic sulfonic acids, such as p-toluenesulfonic acid. Other usable hardeners contain, for example, hydrochloric acid, sulfuric acid or phosphoric acid or mixtures of these acids.

The resins to be foamed may also contain a modifying agent. Such agents are polyesters, high-boiling esters (e.g., dibutyl phthalate) and products of the addition of ethylene oxide onto phenol.

A special procedure for impregnation of the covering material can be carried out by using phenolic resin compositions which contain a defoaming agent as follows: first a foamable phenolic resin is quickly foamed in a suitable cavity in such manner that it wets the cavity wall surfaces, then, due to instability, the foam collapses and thereafter foams up again, except that this second foaming is accompanied by a hardening process so that they take place synchronously, whereby the resulting foam is stabilized and is joined very firmly to that portion of the phenolic resin which is wetting the cavity walls. All of the phenolic resin hardens at the same speed. If phenolic resin without defoamer is employed, the mold cavity is lined with the impregnated covering material in a first process step and then the phenolic resin is foamed in this lined mold.

The manufacture of phenol-formaldehyde foam boards is preferably performed by measuring out and mixing together the above-named components individually, or by using premixes thereof prepared with conventional automatic proportioning and mixing apparatus, and then applying the mixture continuously to the bands of a double-band press by means of a feeding device moving transversely of the direction of advancement. Then the mixture is passed through a gap of adjustable thickness between a roll and a table.

In the application of covering materials to continuously produced phenolic resin foam boards, such as those made in a double-band press, the procedure is to cause the web of the covering material containing cellulose fibers and treated at least on the side facing the foam with the substances which in accordance with the invention improve the strength of adhesion (hydrocarbons, chlorinated hydrocarbons), to come so close to the foamable phenolic resin mixture just behind the point at which the fluid, foamable phenolic resin mixture is applied, that the upper web is also wetted with the phenolic resin mixture. Then the two webs contact the upper and lower band, respectively, of the double-band press and the phenolic resin foam rising from the lower web will bond with the preset upper web. Foaming and setting are performed in the conventional manner. By this process phenolic resin foam boards of the desired thickness are obtained with covering material tightly adhering to the foam surfaces.

In order to more fully illustrate the nature of the invention and the manner of practicing the same, the following comparative examples and examples of the invention are set forth.

EXAMPLES 1 TO 7

In a continuously operating proportioning and mixing machine a fluid, foamable phenolic resin mixture is prepared. It consists of 100 wt-parts of phenol-formaldehyde resin (made by condensing 143 wt-parts of phenol with 228 wt-parts of a 30% aqueous solution of formaldehyde with the addition of 0.715 wt-parts NaOH at 100°C, followed by distilling the water out until the resin content is about 76%), 6.8 wt-parts of n-pentane as blowing agent, and 30.2 wt-parts of a hardener consisting of 10.0 wt-parts of p-toluenesulfonic acid, finely pulverized, 20.0 wt-parts of finely pulverized boric acid, and 0.2 wt-parts of $SiO_2$ (finely pulverized).

With an output of about 2.5 kg/min. this phenolic resin mixture is fed between two paper webs running from supply rolls and passed through a double-band press of 12 m length, heated to 70°C, with lateral curbing and a spacing between upper and lower band of 40 mm. The liquid phenolic resin mixture, as it passes through the press while foaming up and filling the given cavity, adheres also to the upper paper web and hardens within 12 minutes. After leaving the double-band press the finished board is cut to size by lateral and transverse cutters.

In the experiments, phenolic resin foam was covered with paper webs which, in order to demonstrate the described effect of improving adhesion, were used partially with and partially without preliminary treatment.

The tear-away test was performed on 5 specimens 30 mm wide in each test series, to determine the strength of the adherence of the covering papers to the foam boards. At the beginning of each test, the covering material was separated from the foam on a width of about 5 cm to enable it to be gripped in the test apparatus. A pull was then applied at a rate of 100 mm/min. In the following table, the last column shows the forces which were required in order to tear the covering material away from the phenolic resin foam. The values stated are averages of 5 measurements.

In these experimental examples the following paraffinic hydrocarbons or hydrocarbon mixtures and chlorinated paraffins were used.

A: Paraffin oil ("Weissöl")
 Characteristics: Viscosity: 130 cP at 20°C
 Density: 0.875
B: Petroleum jelly
 Characteristics: Flash point: 237°C (per DIN 51584)
 Setting point: 53°C (per DIN 51556)
 Viscosity: 11 cSt (at 210°F per ASTM-D 445)
C: Paraffin
 Characteristics: Setting point: 51°C (per DIN 51556)
 Viscosity: 3.9 cSt at 100°C
D: Chlorinated paraffin
 Characteristics: Density: 1.46 g/cm³ (at 20°C)
 Viscosity: approx. 50,000 cP (at 20°C according to Höppler)
 Chlorine content: 64.3%

From the above it can readily be seen that through the use of several different types of paraffins and chlorinated hydrocarbons a significant improvement in the adhesion of fibrous covering materials to phenolic foams is provided. Indeed, it is seen that in all instances where a cellulosic covering material was treated with a high boiling paraffinic hydrocarbon or chlorinated hydrocarbon, pursuant to the invention, the fibrous covering material was so adhered to the phenolic resol resin cover that it could not be removed by the test procedure. On the other hand, the untreated fibrous material could be removed employing between 0.8 and 1.5 kg.

What is claimed is:

1. A method for improving the strength of adhesion of a fibrous covering material composed of cellulosic fibers to a phenolic resin foam which comprises pretreating the fibrous covering material with:
 1. A fluid paraffin hydrocarbon having a flash point above 150° C and a solidification point of at least 105°C;
 2. A solution of a hydrocarbon named under (1) above;
 3. A fluid, unctuous or solid chlorinated paraffin having a chlorine content of 10 to 75% by weight;
 4. A chlorinated paraffin under paragraph (3) above in solution form or melted form; or
 5. A mixture of hydrocarbons and chlorinated hydrocarbons under paragraphs (1) and (3) above,
on the side of the covering material which is to be in contact with the phenolic resin foam, applying there against a foamable phenolic resin mixture, foaming said phenolic resin mixture and hardening and setting the foam to obtain an article of a phenolic resin and a fibrous covering material having disposed in the region of the interface at least one of the hydrocarbons or chlorinated hydrocarbons described in paragraphs (1) through (5) above.

2. A method according to claim 1 wherein the fibrous covering material is treated with a paraffinic hydrocarbon which is normally solid at room temperature, has a boiling point above 150°C, has a softening point of 105°C, and has a flash point above 150°C.

3. A method according to claim 1 wherein the fibrous covering material is treated with a paraffinic hydrocarbon which is fluid or unctuous at room temperature and which has a boiling point above 250°C and a flash point higher than 150°C.

4. A method according to claim 1 wherein the covering material is impregnated with 0.5 to 40 weight percent, based upon the weight of the covering material, with paraffinic hydrocarbon.

5. Method according to claim 1 wherein the covering material is impregnated with a solution of a paraffinic hydrocarbon.

6. Method according to claim 1 wherein the covering material is impregnated with a paraffinic hydrocarbon in the form of a melt.

7. A coated article comprising a layer of a phenolic resin foam and a cellulosic fibrous covering material, said fibrous covering material impregnated with 0.5 to 40 weight percent of a high boiling paraffinic hydrocarbon or chlorinated hydrocarbon having a chlorine content of 10–75% by weight on the side of the covering material in contact with said phenolic resin foam.

8. A coated article comprising a layer of a phenolic resin foam and a cellulosic covering material, wherein the fibrous covering material is impregnated with 0.5 to 40 weight percent of an agent which is:

1. A fluid paraffin hydrocarbon having a flash point above 150°C and a solidification point of at least 150°C;
2. A fluid, unctuous or solid chlorinated paraffin having a chlorine content of 10 to 75% by weight; or
3. A mixture of hydrocarbons and chlorinated hydrocarbons under paragraphs (1) and (2) above.

* * * * *